US010009512B2

(12) United States Patent
Towata

(10) Patent No.: US 10,009,512 B2
(45) Date of Patent: Jun. 26, 2018

(54) INFORMATION PROCESSING SYSTEM, INFORMATION PROCESSING APPARATUS, SERVER AND INFORMATION PROCESSING METHOD

(71) Applicant: CANON KABUSHIKI KAISHA, Tokyo (JP)

(72) Inventor: Hiroaki Towata, Great Neck, NY (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/366,192

(22) Filed: Dec. 1, 2016

(65) Prior Publication Data
US 2017/0171431 A1   Jun. 15, 2017

(30) Foreign Application Priority Data

Dec. 11, 2015   (JP) .................................. 2015-241934

(51) Int. Cl.
*H04N 1/44* (2006.01)
*G06K 9/00* (2006.01)
*H04N 1/00* (2006.01)

(52) U.S. Cl.
CPC ......... *H04N 1/442* (2013.01); *G06K 9/00268* (2013.01); *G06K 9/00288* (2013.01); *H04N 1/00344* (2013.01); *H04N 2201/0094* (2013.01)

(58) Field of Classification Search
CPC ............................ H04N 1/442; G06K 9/00268
See application file for complete search history.

(56) References Cited

U.S. PATENT DOCUMENTS

| 5,987,186 | A | * | 11/1999 | Oida ..................... H04N 1/4076 |
| | | | | 358/445 |
| 8,289,546 | B2 | | 10/2012 | Hayasaki ..................... 358/1.15 |
| 9,092,605 | B2 | * | 7/2015 | Sambamurthy ......... G06F 21/32 |
| 9,122,516 | B2 | | 9/2015 | Towata ................ G06G 9/4812 |
| 9,727,713 | B2 | * | 8/2017 | Agawa .................... G06F 21/31 |
| 2015/0205658 | A1 | | 7/2015 | Towata ............... G06F 11/0751 |

FOREIGN PATENT DOCUMENTS

JP   2009-147452 A   7/2009

* cited by examiner

*Primary Examiner* — Ibrahim Siddo

(74) *Attorney, Agent, or Firm* — Fitzpatrick, Cella, Harper & Scinto

(57) ABSTRACT

An information processing apparatus requests a server to permit a user to automatically log in to the information processing apparatus, and the server, based on face recognition processing for an image in which the user is imaged, permits the automatic login, and then the information processing apparatus provides its function to the user in response to the permission. The information processing apparatus inquires the server about whether a condition for the user to automatically log out from the information processing apparatus has been satisfied, and the server, based on face recognition processing for an image in which the user or another user is imaged, informs the information processing apparatus that the condition has been satisfied, and then the information processing apparatus stops providing its function to the user in response to the information.

10 Claims, 7 Drawing Sheets

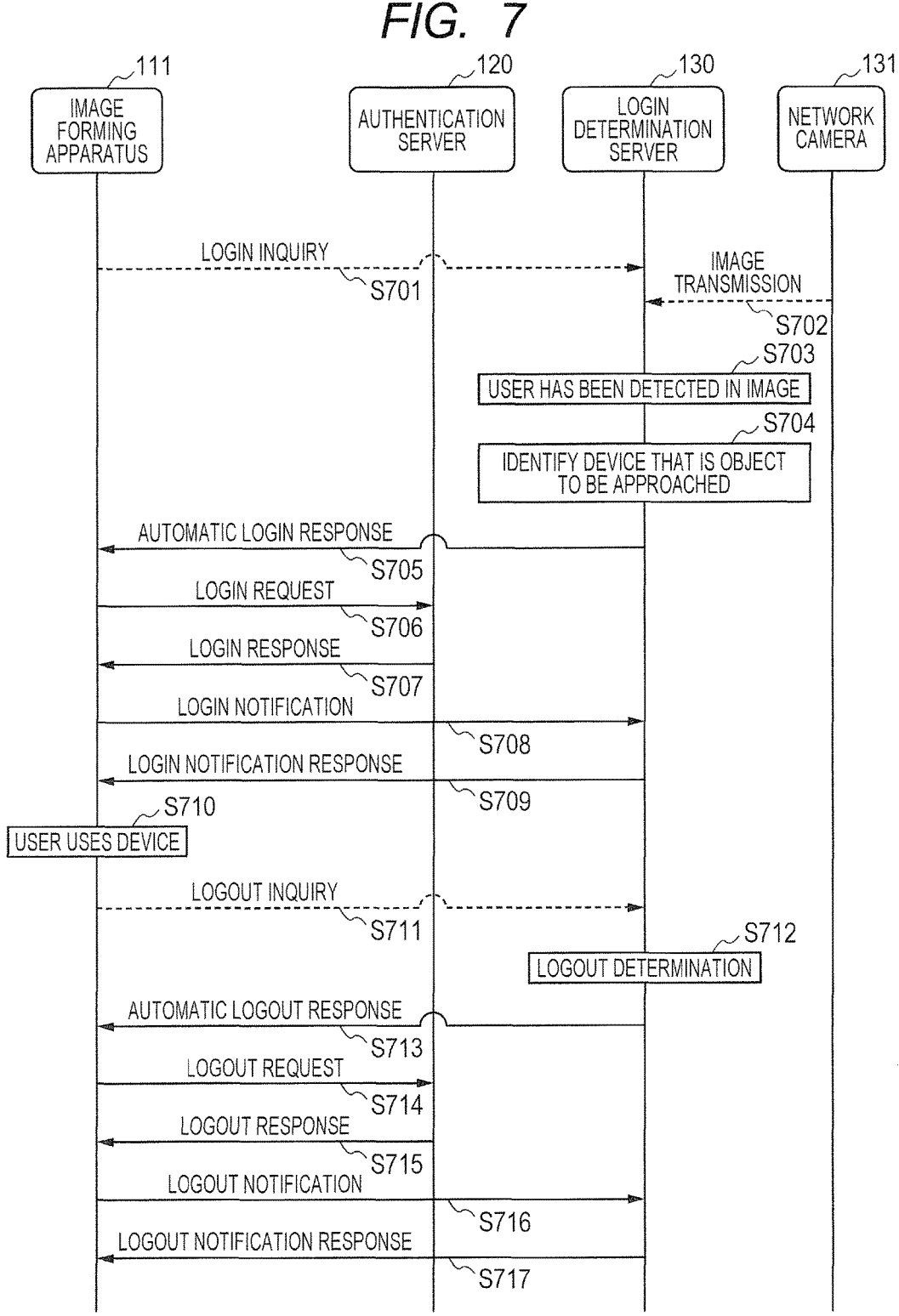

FIG. 8A  { "login" : "true"}

FIG. 8B
```
{
 "LoginInfo" : {
   "MFP" : "10.7.24.112",
   "LoginUser" : "User001"
  }
}
```

FIG. 8C  { "logout" : "true"}

FIG. 8D  { "logout" : "false"}

FIG. 8E
```
{
 "LogoutInfo" : {
   "MFP" : "10.7.24.112",
   "LoginUser" : "User001"
  }
}
```

INFORMATION PROCESSING SYSTEM, INFORMATION PROCESSING APPARATUS, SERVER AND INFORMATION PROCESSING METHOD

BACKGROUND OF THE INVENTION

Field of the Invention

The present invention relates to a face authentication login system for an image forming apparatus. The present invention particularly relates to a method for automatically logging out according to different settings for respective image forming apparatuses.

Description of the Related Art

In recent years, in the image forming apparatus having functions such as a printer, a copier and a scanner, a technology is known that displays operation screens for respective users, and restricts the respective users to use the respective functions. In such an image forming apparatus, user authentication processing is performed. As for the user authentication processing, a password authentication method or a card authentication method is general. In the password authentication method, a user inputs a user ID and a password on an operation panel of the image forming apparatus; and in the card authentication method, a user mounts a card reader for card authentication for an image forming apparatus, on the image forming apparatus, holds the card over the card reader, and thereby logs in. Here, there are problems that in the password authentication method, a user needs to perform a troublesome operation for the user, and in the card authentication method, a user that impersonates the true user by lending of the card can result in logging in. As a technology for solving these problems, the technology is proposed that uses face authentication as user authentication in the image forming apparatus (Japanese Patent Application Laid-Open No. 2009-147452).

SUMMARY OF THE INVENTION

However, the technology described in Japanese Patent Application Laid-Open No. 2009-147452 does not refer to a logout method in the case where the user has automatically logged in by the face authentication. Generally, the logout is executed by an explicit operation by the user or with a lapse of a fixed time period. When having automatically logged in by the face authentication, the user is not conscious of having logged in, and accordingly there is a high possibility that the user forgets to log out by the explicit operation, and results in moving away from the image forming apparatus in a login state. In such a situation, another user can execute a job or an application on the image forming apparatus until the apparatus logs out with the lapse of the time period, which causes a problem that security is lowered. On the other hand, when the user performs logout on the same condition as that of the login by the face authentication, it is assumed that the image forming apparatus results in frequently logging out even while the user is using the apparatus, and that usability is lowered. Because of this, such a unit is required as to achieve the automatic logout which does not lower the usability.

In order to solve the above described problems, the present invention provides an information processing system comprising an information processing apparatus and a server, wherein the information processing apparatus comprises: a login unit configured to make a request to the server for permitting a user to automatically log in to the information processing apparatus, and configured to provide a function of the information processing apparatus to the user in response to a response from the server indicating that the server permits the automatic login; a setting unit configured to set a condition for the user to automatically log out from the information processing apparatus; and a logout unit configured to make an inquiry to the server about whether or not the set condition has been satisfied, and stop providing the function of the information processing apparatus to the user in response to a response from the server indicating that the condition has been satisfied, and wherein the server comprises a determination unit configured to transmits the response to the login unit indicating that the server permits the automatic login, when the determination unit determines to permit the user to automatically log in, based on face recognition processing for an image in which the user is imaged, in response to the request from the login unit, wherein the determination unit transmits the response to the logout unit indicating that the condition has been satisfied, when the determination unit determines that the condition has been satisfied, based on face recognition processing for an image in which the user or another user is imaged, in response to the inquiry from the logout unit.

The face authentication login system for the image forming apparatus in the present invention can perform automatic logout in addition to automatic login, and can enhance the convenience of a user and the security. In addition, the system can execute the automatic logout on a flexible condition, accordingly can perform logout according to the request of the user or the application, and can provide the usability and the security that are suitable for a use environment.

Further features of the present invention will become apparent from the following description of exemplary embodiments with reference to the attached drawings.

BRIEF DESCRIPTION OF THE DRAWINGS

FIG. 7 is a view illustrating a flow of the automatic login and the automatic logout according to the present embodiment.

FIG. 8A is a view illustrating an example in which a login determination server responds whether or not an image forming apparatus may log in, according to the present embodiment.

FIG. 8B is a view illustrating a notification example in which the image forming apparatus notifies the login determination server of login, according to the present embodiment.

FIG. 8C is a view illustrating an example in which the login determination server responds to the image forming apparatus when the logout is necessary, according to the present embodiment.

FIG. 8D is a view illustrating an example in which the login determination server responds to the image forming apparatus when the logout is unnecessary, according to the present embodiment.

FIG. 8E is a view illustrating a notification example in which the image forming apparatus notifies the login determination server of logout, according to the present embodiment.

DESCRIPTION OF THE EMBODIMENTS

Preferred embodiments of the present invention will now be described in detail in accordance with the accompanying drawings.

Figure 1:
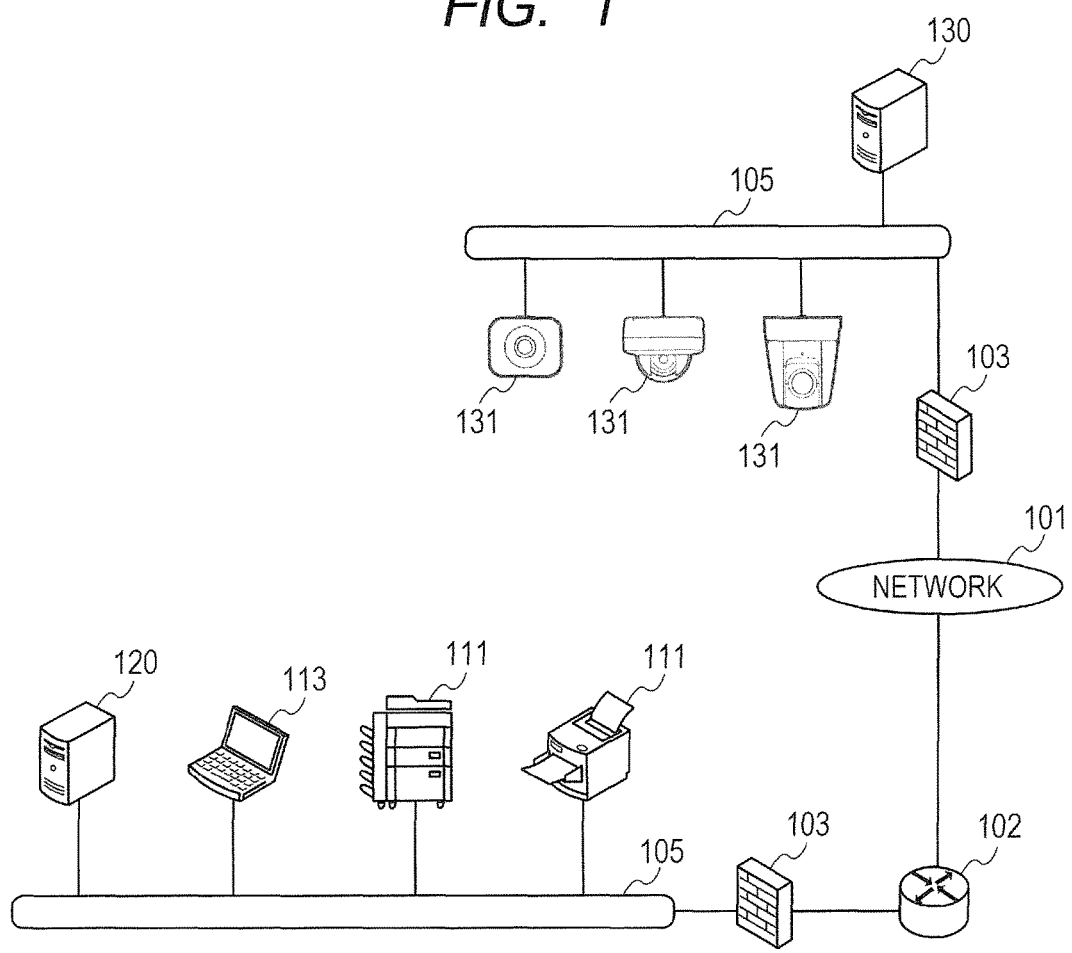
FIG. 1 is a view illustrating a system configuration and a network configuration according to an embodiment of the present invention.

An embodiment for carrying out the present invention will be described below with reference to the drawings. FIG. 1 illustrates one example of a system configuration and a network configuration of an information processing system, for carrying out the present invention. Incidentally, in the following description, an image forming apparatus will be described as an example of an apparatus which a user logs in and logs out, but the apparatus is not limited to the image forming apparatus; and may be any device as long as the device needs login and logout, and may also be an information processing apparatus such as a mobile terminal, for instance. In addition, the present information processing system includes at least an image forming apparatus 111 (image processing apparatus), and a login determination server 130.

As is illustrated in FIG. 1, a LAN (Local Area Network) 105 is connected to a network 101 (Internet, Intranet or the like), through a network device 102 (router, switch and/or the like) and a firewall 103. The network device 102 is an element that connects the networks to each other, and the firewall 103 is an element that controls the permission of communication between the networks. The LAN 105 is a network of the end, which connects a device such as a computer. However, the network is not limited to a cable communication network, but is also a wireless communication network such as a wireless LAN and a portable telephone communication network, in some cases. To the LAN 105, the image forming apparatus 111, a client computer 113, an authentication server 120, a login determination server 130 and a network camera 131 are connected.

The image forming apparatus 111 is, for instance, an SFP that is a printer having a single function, or an MFP having a plurality of functions such as a copier, a scanner and the printer. Incidentally, the SFP is an abbreviation for Single Function Printer, and the MFP is an abbreviation for Multifunction Peripheral. As for the client computer 113, there exist types such as a personal computer, a tablet computer and a smart phone. The authentication server 120 is, for instance, an Active Directory server, and plays a role of the user authentication in an authentication domain. Incidentally, in the present embodiment, the authentication server 120 is not necessarily needed, and it is also possible to allow the user to use the image forming apparatus 111, at the time when the login determination server 130 has responded that the user can log in to the image forming apparatus 111.

The login determination server 130 analyzes the image which the server has received from the network camera 131, in response to the inquiry about the login and the logout sent from the image forming apparatus 111, and thereby returns the need or no need thereof. Incidentally, the authentication server 120 and the login determination server 130 do not necessarily need to be operated in separated physical computers, but it is also acceptable to provide respective functions as server functions in the same physical computer. In the network camera 131, there exist types such as a box-shaped fixed type, a pan tilt type and a wide angle type, according to differences in the lens and the operation mechanism.

Figure 2:
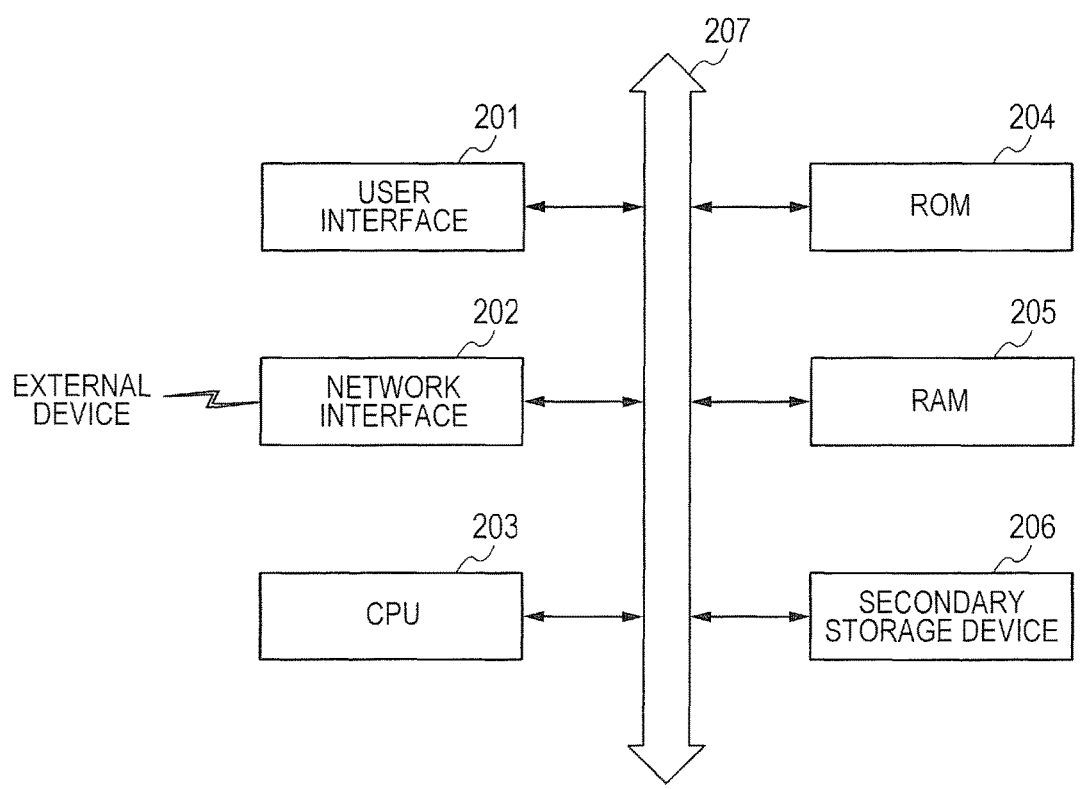
FIG. 2 is a view illustrating a hardware configuration of an information processing function according to the present embodiment.

FIG. 2 illustrates a module configuration of information processing functions of the image forming apparatus 111, the client computer 113, the authentication server 120, the network camera 131 and the login determination server 130. The user interface 201 inputs and outputs information sent from a display, a keyboard, a mouse, a touch panel and the like. A computer that is not provided with these hardware devices can be connected to another computer, and can be operated from the computer, through a remote desktop, a remote shell or the like. The network interface 202 is connected to the network such as the LAN, and communicates with another computer and a network device. A ROM 204 is a storage element in which an incorporated program and data are recorded. A RAM 205 is a storage element that functions as a temporary memory region. A secondary storage device 206 is such a storage device as to be represented by a HDD. A CPU 203 executes a program that has been read from the ROM 204, the RAM 205, the secondary storage device 206 or the like. Each section is connected to others through an input/output interface 207.

Figure 3:
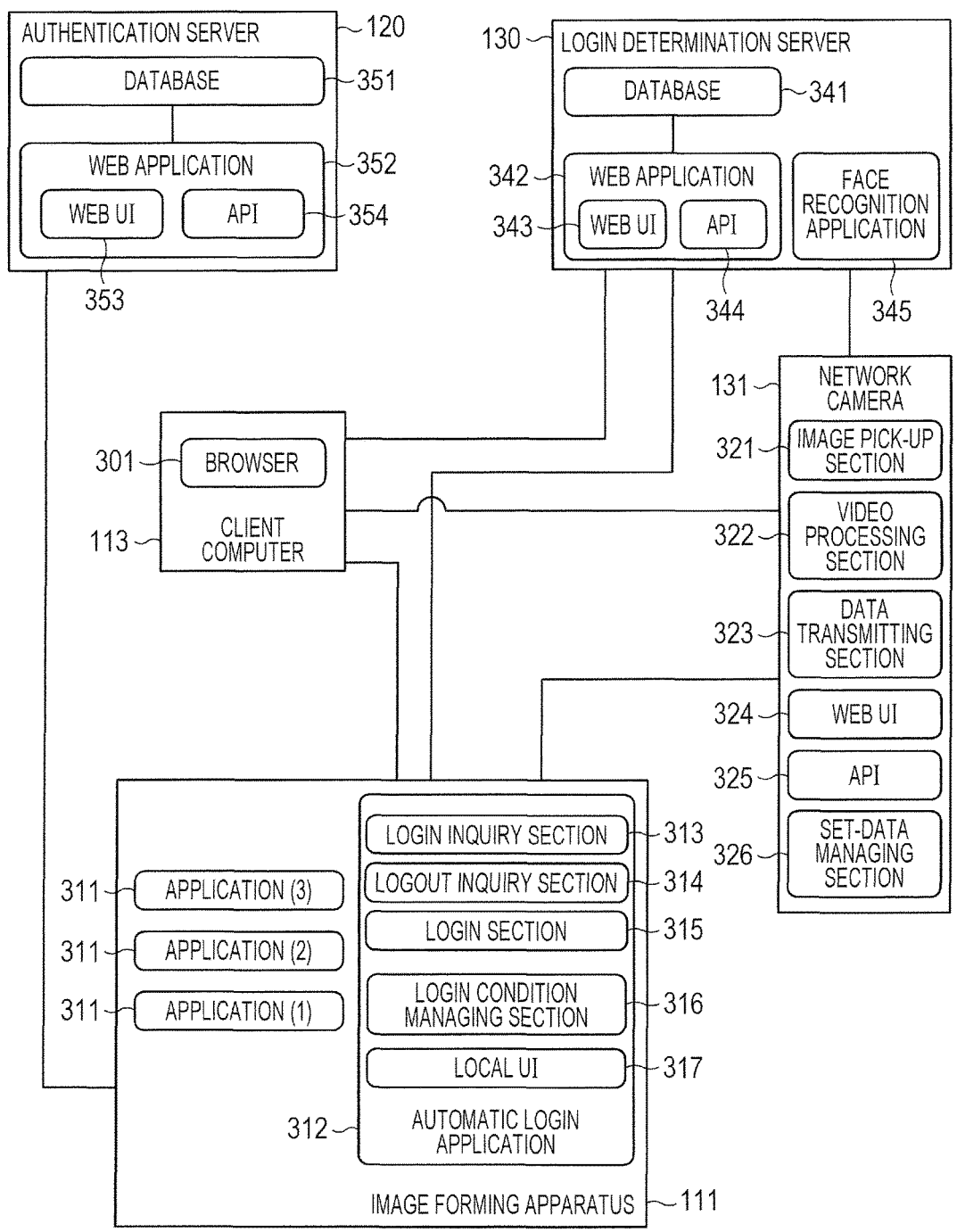
FIG. 3 is a view illustrating a software configuration and a network interconnection of a system according to the present embodiment.

FIG. 3 illustrates a software configuration and an interconnected state through the network of the present system. The login determination server 130 is provided with a database 341, a web application 342 and a face recognition application 345. The database 341 holds data that are necessary for each function of the login determination server 130. The web application 342 provides a Web user interface (hereinafter referred to as "Web UI") 343, and an application programming interface (hereinafter referred to as "API") 344. The Web application 342 processes a request sent from another device through the network, accesses the data of the database 341, as needed, executes various functions, and returns the response. The face recognition application 345 is an application that performs face recognition processing.

The authentication server 120 is provided with a database 351 and a Web application 352. The database 351 holds data that are necessary for each of the functions of the authentication server 120. The Web application 352 provides a Web UI 353 and an API 354. The Web application 352 processes a request sent from another device through the network, accesses the data of the database 351, as needed, executes various functions, and returns the response.

The network camera 131 is provided with an image pick-up section 321, a video processing section 322, a data transmitting section 323, the Web UI 324, the API 325, and a set-data managing section 326. The image pick-up section 321 controls a lens, an imaging element and the like of a camera, and acquires an image. The video processing section 322 subjects an original image that has been acquired by the image pick-up section 321, to processing to process the image into video data or the like. In addition, the video processing section 322 performs additional processing such as image recognition, and obtains additional information from the image or the video. The data transmitting section 323 transmits the video data to another device on the network. The Web UI 324 provides a viewer screen and a management screen of the network camera. In the viewer screen, the Web UI 324 can operate a direction, a zoom, a focus and the like of the camera, while checking the video that has been captured by the camera. In the management screen, the Web UI 324 can perform preset registration of an image pick-up position of the camera, designate processing that is performed in the video processing section 322, and register an address of the video data that is transmitted by the data transmitting section 323. The API 325 performs the operation of the camera, the registration of the set data and the like, according to the request sent from another device. The set-data managing section 326 holds the set data for the image pick-up section 321, the video processing section 322 and the data transmitting section 323.

In the image forming apparatus ill, various applications 311 and an automatic login application 312 are executed. A plurality of applications 311 can be installed in the image forming apparatus 111, according to the function and the purpose, and can be executed. The applications 311 include, for instance, applications that execute copying, scanning, printing and the like. The image forming apparatus 111 itself cannot detect an approach and an exit of the user, but can detect the approach and the exit of the user by inquiring of the login determination server 130 through the automatic login application 312, and can perform login/logout. In addition, in order to make the user log out, not only by the approach and/or the exit of the user but also by other factors, the image forming apparatus 111 may receive information on the logout from the login determination server 130, and may perform login/logout. In addition, the automatic login application 312 may be one of the applications 311.

The automatic login application 312 is provided with a login inquiry section 313 and a logout inquiry section 314. The image forming apparatus 111 inquires of the login determination server 130 about login through the login inquiry section 313, requests the login to the authentication server 120 according to the response, and makes the user automatically log in. Thereby, the function of the image forming apparatus 111 is provided to the user. The image forming apparatus 111 inquires of the login determination server 130 about logout through the logout inquiry section 314, requests the logout to the authentication server 120 according to the response, and makes the user automatically log out. Thereby, the provision of the functions of the image forming apparatus 111 to the user is stopped.

The automatic login application 312 is further provided with a login section 315, a login condition managing section 316 and a local UI 317. The login section 315 provides a login screen for the user to use the image forming apparatus 111, to the user interface 201 of the image forming apparatus 111. The user can use various functions of the image forming apparatus, by inputting a user ID and a password in the login screen. Alternatively, the user can also use the ID card for using the image forming apparatus, which has been distributed to the user beforehand. Incidentally, as for the logout by an explicit operation of the user, the image forming apparatus does not provide a dedicated screen, but makes the user press a button on the screen during use or a physical button, and thereby log out. The login condition managing section 316 manages settings of validation and invalidation of the login and the logout. In addition, the image forming apparatus 111 inquires of the login determination server 130 about the logout, but the login condition managing section 316 manages the condition for the inquiry about the logout. The local UI 317 provides a screen for the user to directly operate the application 311, the login section 315 and the like.

TABLE 1

Table A Network camera management table 1010

| 1011<br>IP address | 1012<br>Maker name | 1013<br>Name of<br>apparatus | 1014<br>Camera type | 1015<br>Camera name | 1016<br>Installation<br>place |
|---|---|---|---|---|---|
| 192.168.2.101 | DEVICE_MAKER_001 | WV-1 | Pan tilt | WV-1 (1F RoomA) | 1F RoomA |
| 192.168.2.102 | DEVICE_MAKER_001 | WV-9 | Wide angle | WV-9 (3F RoomC) | 3F RoomC |
| 192.168.2.103 | DEVICE_MAKER_001 | WV-11 | Box-shaped fixed type | WV-11 (10F RoomD) | 4F RoomD |

Table A is a network camera management table 1010 in a database 341 for managing a plurality of network cameras 131. An IP address of the network camera 131 is stored in a column 1011, a maker name is stored in a column 1012, a name of the apparatus is stored in a column 1013, and a camera type such as a pan tilt type, a wide angle type and a box-shaped fixed type is stored in a column 1014. In addition, a camera name that is set for each of the network cameras 131 is stored in a column 1015, and installation place information on each of the network cameras 131 is stored in a column 1016.

TABLE 2

Table B In-image device managing table 1020

| 1021<br>Network<br>camera<br>IP address | 1022<br>Device<br>IP address | 1023<br>In angle<br>of view<br>Coordinate X | 10210<br>In angle<br>of view<br>Coordinate Y | 1025<br>Login<br>User | 1026<br>Login date<br>and time |
|---|---|---|---|---|---|
| NVS_00001 | 192.168.1.101 | 200 | 400 | user001 | Jun. 21, 2015 9:03 |
| NVS_00002 | 192.168.1.102 | 20 | 612 | user002 | Jun. 20, 2015 17:33 |
| NVS_00002 | 192.168.1.103 | 810 | 300 | — | — |
| NVS_00003 | 192.168.2.11 | 10 | 36 | user003 | Jun. 24, 2015 7:43 |

Table B is an in-image device managing table 1020 in the database 341 for managing the image forming apparatus 111 in the image which the network camera 131 has imaged. In the image forming apparatus 111 in the image, the information is previously registered by a manager through the Web UI 343. An IP address of the network camera 131 is stored in a column 1021, an IP address of the image forming apparatus 111 is stored in a column 1022, an X-coordinate in the image is stored in a column 1023, and a Y-coordinate in the image is stored in a column 1024. In addition, the user ID of the user who currently logs in the image forming apparatus is stored in a column 1025, and the date and time at which the user who currently logs in logged in are stored in a column 1026.

TABLE 3

Table C User management table 1030 of face authentication server

| 1031 | 1032 |
|---|---|
| Use ID | Feature amount data |
| USR_00001 | fjieowanoniewafnioewanfoniwafnewaonfoiewan |
| USR_00002 | oenoewnaofniewanofnewanfnoainfeioanwif4e01 |
| USR_00003 | nfoiewnaonfiewnaiofnpewoanfioa90k2msa9o34 |

Table C is a user management table 1030 in the database 341, for managing the feature amount of the user in the login determination server 130. The user ID is stored in a column 1031, and the binary data in which information on the face of the user is converted into the feature amount is stored in a column 1032.

TABLE 4

Table D User management table 1040 of face authentication server

| 1031 | 1042 | 1043 |
|---|---|---|
| User ID | Password | Final login date and time |
| USR 00001 | abcdefg | Jan. 1, 2016 |
| USR 00002 | hijklmn | Jan. 2, 2016 |
| USR 00003 | opqrstu | Jan. 3, 2016 |

Table D is a user management table 1040 in a database 351, for the authentication server 120 to manage the user. The user ID is stored in a column 1041, a password for the user to log in is stored in a column 1042, and the final login date and time of the user are stored in a column 1043.

Figure 4:
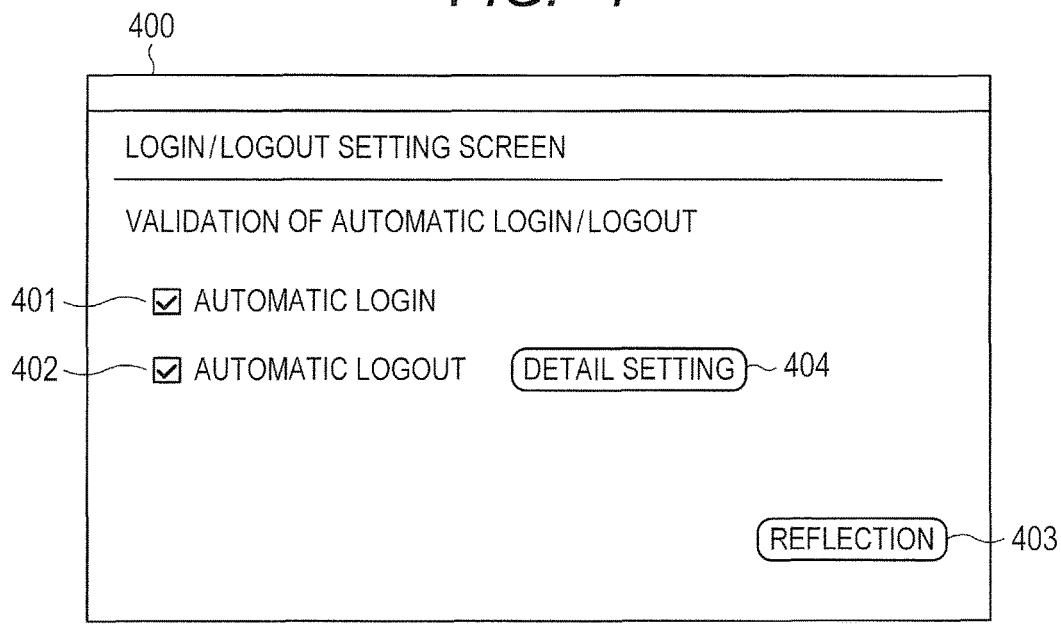
FIG. 4 is a view illustrating a setting screen for automatic login and automatic logout according to the present embodiment.
Figure 6:
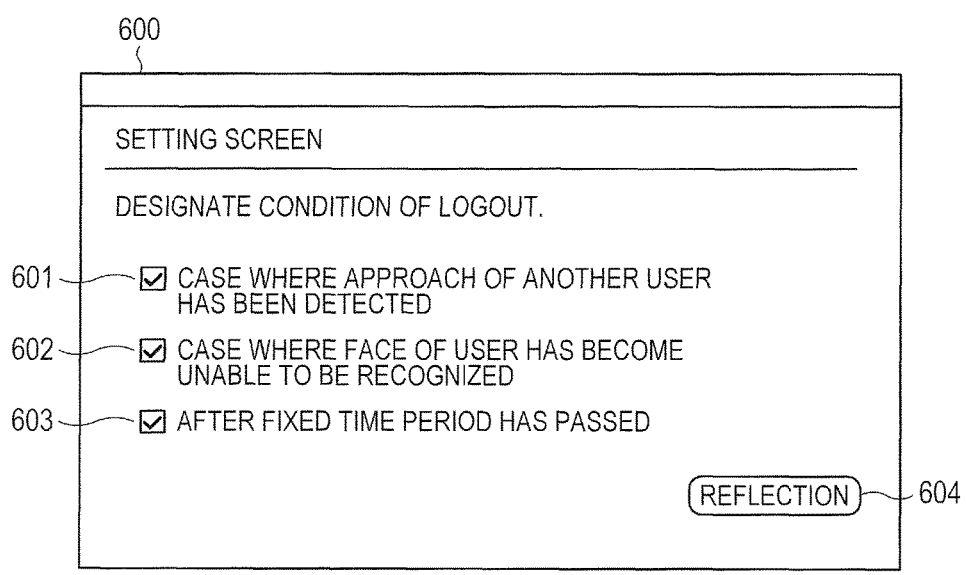
FIG. 6 is a view illustrating a logout setting screen for a user to set conditions of the automatic logout according to the present embodiment.

Next, a setting screen 400 will be described below with reference to FIG. 4, which the automatic login application 312 of the image forming apparatus 111 displays on the local UI 317. A check box 401 is a box for validating the automatic login, and when the user presses a reflection button 403 in a state in which the check box is checked, the login inquiry section 313 is validated, and is enabled to make an inquiry for automatically logging in. It is also acceptable to validate the automatic login of the image forming apparatus 111 at the time of initial installation. A check box 402 is a box for validating the automatic logout, and when the user presses a reflection button 403 in a state in which the check box is checked, the logout inquiry section 314 is validated. Furthermore, when the automatic login is performed and the image forming apparatus becomes such a state that the user has logged in, the logout inquiry section 314 is enabled to make an inquiry for automatically logging out. It is also acceptable to validate the automatic logout of the image forming apparatus 111 at the time of initial installation. A detail setting button 404 is a button for setting the conditions for automatically logging out, and when the button is pressed, the setting screen of the logout conditions is displayed, which is illustrated in FIG. 6.

Figure 5:
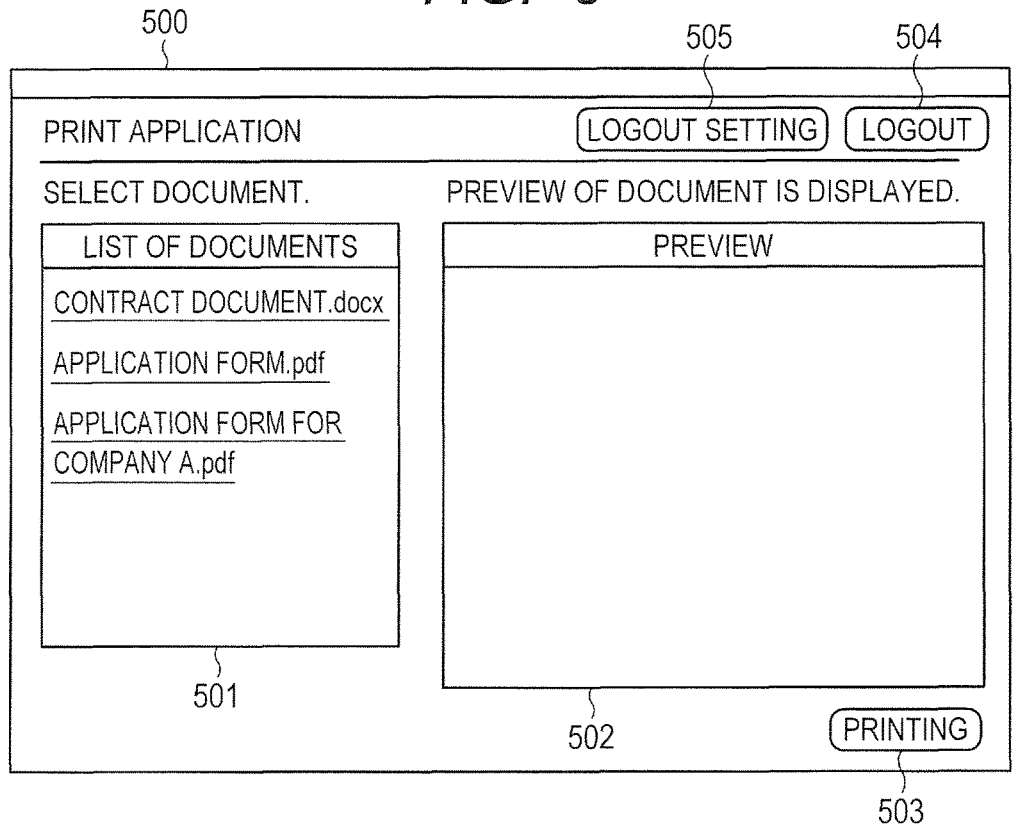
FIG. 5 is a view illustrating a screen of an application on an image forming apparatus according to the present embodiment.

Next, a screen 500 of the application 311 will be described below with reference to FIG. 5, which is displayed on the local UI 317 of the image forming apparatus 111. A user can print the document while previewing the list of the documents that are stored in the image forming apparatus 111, by using this screen 500. A list 501 of the documents is a list of documents which the user can designate and print. A screen 502 is a screen on which a preview of the document is displayed that has been selected in the list 501 of the documents. The printing button 503 is a button for instructing the execution of printing, and when the button is pressed, the selected document is printed. A logout button 504 is a button for instructing logout, and when having pressed the button, the user can end the use of the image forming apparatus 111 by an explicit instruction of the user, which is different from the automatic logout. The logout setting button 505 is a button for setting the logout, and when the button is pressed, the setting screen of the logout conditions is displayed, which is illustrated in FIG. 6.

Next, a screen example of a logout setting screen 600 will be described below with reference to FIG. 6, which is displayed on a local UI 317 of the image forming apparatus 111. Incidentally, the logout setting screen 600 can be set in the automatic login application 312 itself of the image forming apparatus 111, in each of the respective applications 311, and/or for each of the users. For instance, in the initial setting, the setting of the automatic login application 312 itself is validated, and a content set when the user has logged in and has pressed the detail setting button 404 in FIG. 4 is held for each of the users. In addition, a content which the user has set by pressing the logout setting button 505 in FIG. 5 while using the application is held for each of the applications.

A check box 601 is a box for validating the setting for automatically logging out, in the case where the login determination server has detected the approach of another user. Here, the case where another user has approached (has approached within predetermined distance) means a case where a face of a user other than the user who has logged in by the automatic login is seen in the image that has been imaged by the network camera 131. The present setting is effective if having been validated when the document is comparatively highly confidential, and the user does not want that an operation screen is seen by someone. For instance, in the screen example illustrated in FIG. 5, the preview of the document is displayed, and accordingly the setting is particularly effective.

A check box 602 is a box for validating the setting for the user to automatically log out, in the case where the face recognition application has become unable to recognize the face of the user. Generally, in many cases, the user operates in front of the image forming apparatus 111 while the application 311 is executed, but when the user uses the image forming apparatus 111 which has such a size that a housing reaches several meters, there is a high possibility that the user exits from the inside of the image which the network camera 131 has imaged. Because of this, it is effective to change the setting of the validation and the invalidation of the present setting, according to the size and the type of the image forming apparatus 111 to be used.

A check box 603 is a box for validating the setting for the user to automatically log out, in the case where a fixed time period has passed after the user logged in. Generally, from the viewpoint of security, the image forming apparatus makes the user compulsorily log out, when a fixed time period has passed after the user logged in. However, the operation of some application 311 takes a very long time, and accordingly there is the case where the user does not want to log out for a fixed time period. In such a case, it is possible to enhance the usability by invalidating the present setting and preventing the image forming apparatus from logging out in the fixed time period.

A reflection button 604 is a button for reflecting logout setting. Incidentally, it is fundamental that the logout condition can be flexibly set in consideration of the application 311 to be used and a user environment in which the image forming apparatus 111 has been installed, and the logout condition is not limited to the logout setting that has been described in the present exemplary embodiment. Incidentally, the security of the image forming apparatus 111 is enhanced by that the user checks all of the items of the check boxes 601 to 603, but it is not necessarily necessary to check all of the items.

Next, a flow of automatic login and automatic logout to and from the image forming apparatus 111 by the cooperation of the image forming apparatus 111, the authentication server 120, the login determination server 130 and the network camera 131 will be described below with reference to FIG. 7. Incidentally, the flows will be described below on the supposition that a host name of the login determination server 130 is autologin.sample.com, and the image forming apparatus 111 and the login determination server 130 communicates with each other based on http communication. The communication method is an arbitrary protocol, and is not limited to http. Incidentally, the following processing is executed by the automatic login application 312 of the image forming apparatus, and each of the steps is represented by "S".

In S701, the image forming apparatus 111 inquires of the login determination server 130 about login. At this time, the image forming apparatus 111 adds information that uniquely identifies the image forming apparatus 111, such as the IP address of itself, to the inquiry. For instance, the image forming apparatus 111 inquires of the URL that is http://autologin.sample.com/login/?=10.8.24.112, by a GET method. When a user does not approach the image forming apparatus 111 and a user whom the image forming apparatus 111 makes log in does not exist, as a result of the login inquiry, this inquiry is repeated in a fixed time cycle. This inquiry is performed only when the automatic login is validated in the setting of the automatic login application 312.

In S702, the network camera 131 transmits the image which the network camera 131 has imaged, to the login determination server 130. The network camera 131 intermittently transmits the image to the login determination server 130, and the login determination server 130 analyzes the image which the login determination server 130 has received, by the face recognition application 345. Here, in S702, the network camera 131 periodically transmits the image, and may transmit the image, for instance, by a moving image or the like in real time.

In S703, the face recognition application 345 of the login determination server 130 detects the user in the image. At this time, the login determination server 130 compares the feature amount of the user, which is obtained with reference to the feature amount management table 1030, with the feature amount of the face image in the image, and when the feature amount of a fixed threshold or more has coincided with the other amount, identifies the user. In S704, the login determination server 130 identifies the image forming apparatus 111 which the user has approached, with reference to an image forming apparatus management table 1020. At this time, the login determination server 130 can identify the image forming apparatus 111, from the X coordinate and the Y coordinate of the user in the image, and the X coordinate and the Y coordinate of the image forming apparatus that is managed by the image forming apparatus management table 1020. For instance, firstly, the face recognition application 345 of the login determination server 130 recognizes a user who is a user 001, in the image which the login determination server 130 has received from NVS_00001. Subsequently, when the coordinates in the image of the face image which the face recognition application 345 has recognized are in the vicinity of (200, 400), the face recognition application 345 understands that the user having a user ID which is the user 001 approaches the image forming apparatus 111 of which the IP address is 192.168.1.101.

In S705, the login determination server 130 responds the automatic login to the image forming apparatus 111 which the user approaches. Because the IP address of the image forming apparatus 111 is contained in the inquiry about the user approach in S701, the login determination server 130 can return the automatic login response only to the image forming apparatus 111 which the user approaches. In the automatic login response, the user ID of a login object is contained. The example of the content of the response is illustrated in FIG. 8A. When there does not exist a user who is an object that is allowed to automatically log in, the login determination server 130 sets a null character in the user ID illustrated in FIG. 8A, and returns the content to the image forming apparatus 111.

In S706, the image forming apparatus 111 transmits a login request to the authentication server 120. In the login request, the user ID is contained. As for the communication with the authentication server 120, when the authentication server is formed of Active Directory, for instance, the image forming apparatus can give and receive the authentication information through an LDAP protocol, but the communication is not limited to the method. In S707, the authentication server 120 transmits the login response to the image forming apparatus 111. At this time, the user ID is contained in the login request and the user has been already capable of being identified by the face authentication, and accordingly the authentication server 120 transmits the response that the user always can log in. Incidentally, in the present exemplary embodiment, the image forming apparatus requests login to the authentication server 120, but the image forming apparatus 111 may permit the user to use the image forming apparatus 111, at the time when the image forming apparatus 111 has received the response of the automatic login, in S705.

In S708, the image forming apparatus 111 notifies the login of the login determination server 130. For instance, the image forming apparatus 111 notifies the login information illustrated in FIG. 8B, of the URL that is http://autologin.sample.com/login, by a POST method. In S709, the login determination server 130 updates the image forming apparatus management table 1020, based on the information that the login determination server has received in S708. The specific contents of the update are an update of the login date and time to the latest data, and the like. Subsequently, the login determination server 130 returns a response that the login determination server 130 has received the login notification, to the image forming apparatus 111.

In S710, the user uses a desired function of the image forming apparatus 111. The user shall use the desired function of the image forming apparatus 111, also while the following processes are executed. In S711, the image forming apparatus 111 inquires of the login determination server 130 about the logout. The image forming apparatus 111 adds the information that uniquely identifies the image forming apparatus 111, such as the IP address of itself, to the inquiry. When the check boxes 601 to 603 are validated in the logout setting screen 600 in FIG. 6, the image forming apparatus 111 performs the processes in the following way.

When the check box 601 is validated, the image forming apparatus 111 inquires of the URL (http://autologin.sample.com/logout/?=10.8.24.112&type=findOtherUser) about the logout, by the GET method of HTTP. This inquiry contains an instruction of findOtherUser, and accordingly the image forming apparatus 111 results in asking the login determination server 130 to perform the determination of making the user immediately log out, when the login determination server 130 has detected the approach of another user.

When the check box 602 is validated, the image forming apparatus 111 inquires of the URL (http://autologin.sample.com/logout/?=10.8.24.112&type=faceDetection&range=120) about the logout, by the GET method of HTTP. This inquiry contains an instruction of faceDetection and an instruction of a distance of 120, and accordingly the image forming apparatus 111 results in asking the login determination server 130 to perform the determination of making the user log out, when a distance between the image forming apparatus 111 and the user becomes 120 cm or longer, as a result of the face recognition.

When the check box 603 is validated, the image forming apparatus 111 inquiries of the URL (http://autologin.sample.com/logout/?=10.8.24.112&type=time&duration=60) about the logout, by the GET method of HTTP. This inquiry contains an instruction of time&duration and an instruction of a time period of 60, and accordingly the image forming apparatus 111 results in asking the login determination server 130 to perform the determination of making the user log out, when 60 seconds has passed after the user logged in.

Incidentally, as for the settings of the check boxes 601 to 603, it is also possible to set a plurality of settings at the same time, and accordingly when a plurality of conditions have been set, the inquiry about the logout contains a plurality of conditions. For instance, when the check boxes 602 and 603 are valid, the image forming apparatus 111 can inquire about the logout on the following composite condition:
http://autologin.sample.com/logout/?=10.8.24.112&type=time, faceDetection&duration=60&range=120.

While the user logs in the image forming apparatus 111, the image forming apparatus 111 repeats this inquiry in a fixed time cycle. This logout inquiry for the automatic logout is performed only when the automatic logout is validated in the setting of the automatic login application 312. Incidentally, even though the automatic logout is validated in the setting of the automatic login application 312, when any box in the check boxes 601 to 603 is not set, the image forming apparatus 111 logs out only by the explicit instruction of the user. In this case, the image forming apparatus 111 inquiries the logout, of the URL (http://autologin.sample.com/logout/?=10.8.24.112&type=waitUserLogout), by the GET method. In addition, the user can log out at an arbitrary timing, for instance, by pressing the logout button 504 in FIG. 5.

In S712, the login determination server 130 analyzes the image forming apparatus management table 1020, based on the information which the login determination server 130 has received in S711, and the image which the login determination server 130 has received from the network camera 131, if needed for the determination, and thereby determines whether or not the information coincides with the logout condition. In S713, the login determination server 130 returns the automatic logout response to the image forming apparatus 111. An example of a response showing an instruction of making the user log out is illustrated in FIG. 8C, and an example of a response that logout is unnecessary is illustrated in FIG. 8D.

In S714, when the automatic logout response which the image forming apparatus 111 has received in S713 is an instruction of making the user automatically log out, the image forming apparatus 111 transmits the logout request to the authentication server 120. In the logout request, the user ID is contained. In S715, the authentication server 120 transmits the logout response to the image forming apparatus 111. Incidentally, in the present exemplary embodiment, the image forming apparatus 111 requests the logout to the authentication server 120, but may prohibit the user from using the image forming apparatus 111, at the time when the image forming apparatus 111 has received the automatic logout response in S713.

In S716, the image forming apparatus 111 notifies the login determination server 130 of the logout. For instance, the image forming apparatus 111 notifies the URL (http://autologin.sample.com/logout) of the logout information illustrated in FIG. 8E, by the POST method of HTTP. In S717, the login determination server 130 updates the image forming apparatus management table 1020, based on the information that the login determination server 130 has received in S716. In this case, the login determination server 130 updates the login user 1025 and the login date and time 1026 in the image forming apparatus management table 1020, to empty information. Subsequently, the login determination server 130 returns a response that the login determination server 130 has received the logout notification, to the image forming apparatus 111.

As has been described above, the information processing system according to the present embodiment performs not only automatic login but also automatic logout, and enhances the convenience of the user and the security. Furthermore, the system can flexibly designate the condition of the automatic logout, and accordingly can provide a logout method that is suitable for each image forming apparatus 111 and each application 311 which the user uses, and for each user. In addition, in the present embodiment, it is fundamental that the information processing system makes the user log out according to the optimal logout condition, and the logout method is not limited to the methods of changing the logout conditions depending on the respective image forming apparatuses 111, the respective applications 311 and the respective users, as has been described. For instance, the information processing system can be configured so that the user who has an unexecuted print job in the image forming apparatus 111 logs out only by the explicit logout of the user.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-241934, filed Dec. 11, 2015, which is hereby incorporated by reference herein in its entirety.

What is claimed is:

1. An information processing system comprising an information processing apparatus and a server,
wherein the information processing apparatus includes
at least a first processor; and
at least a first memory coupled to the at least first processor and having stored therein instructions which, when executed by the at least first processor, cause the at least first processor to function as:
a login unit configured to make a request to the server for permitting a user to automatically log in to the information processing apparatus, and configured to provide a function of the information processing apparatus to the user in response to a response from the server indicating that the server permits the automatic login;
a setting unit configured to be capable of setting at least one condition for the user to automatically log out from the information processing apparatus; and
a logout unit configured to make an inquiry to the server about whether or not the set condition has been satisfied, and stop providing the function of the information processing apparatus to the user in response to a response from the server indicating that the condition has been satisfied,
wherein, in a case that no condition is set, the logout unit makes the inquiry to the server, including an instruction that the information processing apparatus logs out only by an explicit instruction of the user, and
wherein the server includes
at least a second processor; and
at least a second memory coupled to the at least second processor and having stored therein instructions which, when executed by the at least second processor, cause the at least second processor to function as
a determination unit configured to transmit the response to the login unit indicating that the server permits the automatic login, when the determination unit determines to permit the user to automatically log in, based on face recognition processing for an image in which the user is imaged, in response to the request from the login unit,
wherein the determination unit transmits the response to the logout unit indicating that the condition has been satisfied, when the determination unit determines that the condition has been satisfied, based on face recognition processing for an image in which the user or another user is imaged, in response to the inquiry from the logout unit.

2. The information processing system according to claim 1, wherein the set condition is at least one of conditions that the other user has approached within a predetermined distance from the information processing apparatus, that the face recognition processing of the user has become unable to be performed, and that a fixed time period has passed after automatic login of the user.

3. The information processing system according to claim 1, wherein the information processing apparatus comprises an image forming apparatus.

4. The information processing system according to claim 1, wherein the determination unit applies the face recognition processing to an image in which the user is imaged by a network camera.

5. The information processing system according to claim 1, wherein the determination unit performs the determination, based on a table that manages the information processing apparatus, and a table that manages a feature amount for the face recognition processing.

6. The information processing system according to claim 1, wherein the determination unit executes the face recognition processing by a face recognition application.

7. The information processing system according to claim 1, wherein when a plurality of applications are used in the information processing apparatus, the setting unit can set different conditions for automatically logging out for the respective applications.

8. The information processing system according to claim 1, wherein when a plurality of users use the information processing apparatus, the setting unit can set different conditions for automatically logging out for the respective users.

9. An information processing method in an information processing system comprising an information processing apparatus and a server, the method comprising:
in the information processing apparatus, making a request to the server for permitting a user to automatically log in to the information processing apparatus;
in the server, transmitting a response to the information processing apparatus indicating that the server permits the automatic login, when the server determines to permit the user to automatically log in, based on face recognition processing for an image in which the user is imaged, in response to the request from the information processing apparatus;
in the information processing apparatus, providing a function of the information processing apparatus to the user in response to the response from the server indicating that the server permits the automatic login;
in the information processing apparatus, making an inquiry to the server about whether or not a set condition for the user to automatically log out from the information processing apparatus has been satisfied;
in the server, transmitting a response to the information processing apparatus indicating that the condition has been satisfied, when the server determines that the condition has been satisfied, based on face recognition processing for an image in which the user or another user is imaged, in response to the inquiry from the information processing apparatus; and in the information processing apparatus, stopping providing the function of the information processing apparatus to the user in response to the response from the server indicating that the condition has been satisfied, wherein, in a case that no condition is set, the information processing apparatus makes the inquiry to the server, including an instruction that the information processing apparatus logs out only by an explicit instruction of the user.

10. A non-transitory computer-readable storage medium storing a program for causing a computer to execute an information processing method in an information processing system comprising an information processing apparatus and a server, the method comprising:

in the information processing apparatus, making a request to the server for permitting a user to automatically log in to the information processing apparatus;

in the server, transmitting a response to the information processing apparatus indicating that the server permits the automatic login, when the server determines to permit the user to automatically log in, based on face recognition processing for an image in which the user is imaged, in response to the request from the information processing apparatus;

in the information processing apparatus, providing a function of the information processing apparatus to the user in response to the response from the server indicating that the server permits the automatic login;

in the information processing apparatus, making an inquiry to the server about whether or not a set condition for the user to automatically log out from the information processing apparatus has been satisfied;

in the server, transmitting a response to the information processing apparatus indicating that the condition has been satisfied, when the server determines that the condition has been satisfied, based on face recognition processing for an image in which the user or another user is imaged, in response to the inquiry from the information processing apparatus; and in the information processing apparatus, stopping providing the function of the information processing apparatus to the user in response to the response from the server indicating that the condition has been satisfied, wherein, in a case that no condition is set, the information processing apparatus makes the inquiry to the server, including an instruction that the information processing apparatus logs out only by an explicit instruction of the user.

* * * * *